May 6, 1930.   J. C. TRAVILLA, JR   1,757,347
LOCOMOTIVE STRUCTURE
Filed Feb. 10, 1928   2 Sheets-Sheet 2
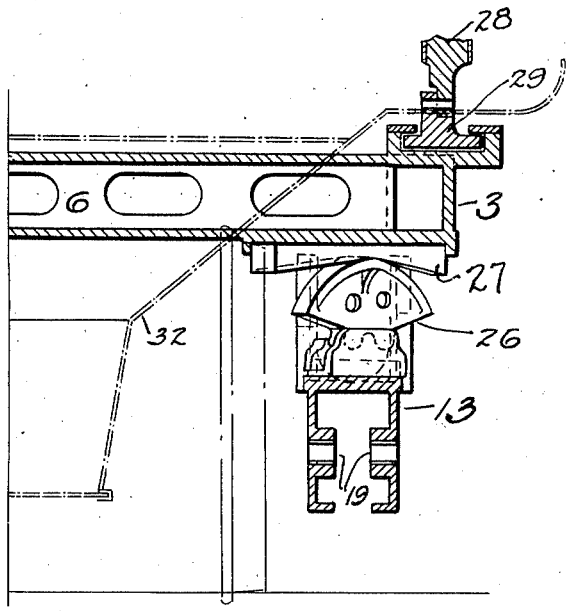
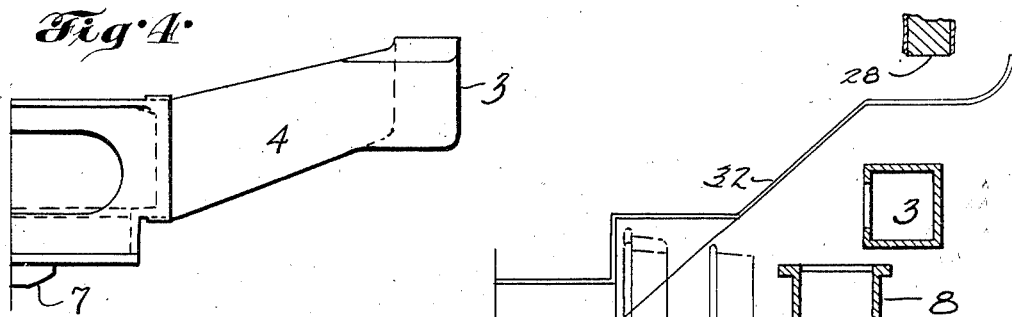
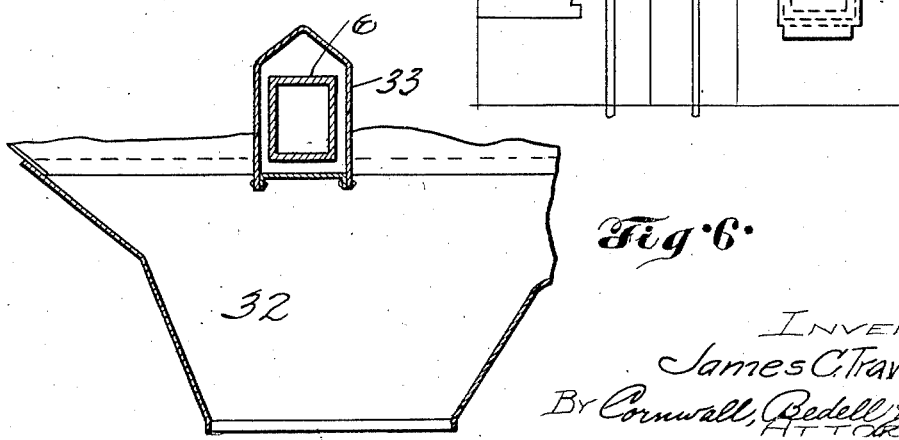
INVENTOR
James C. Travilla, Jr.
By Cornwall, Bedell & James
ATTORNEYS Patented May 6, 1930

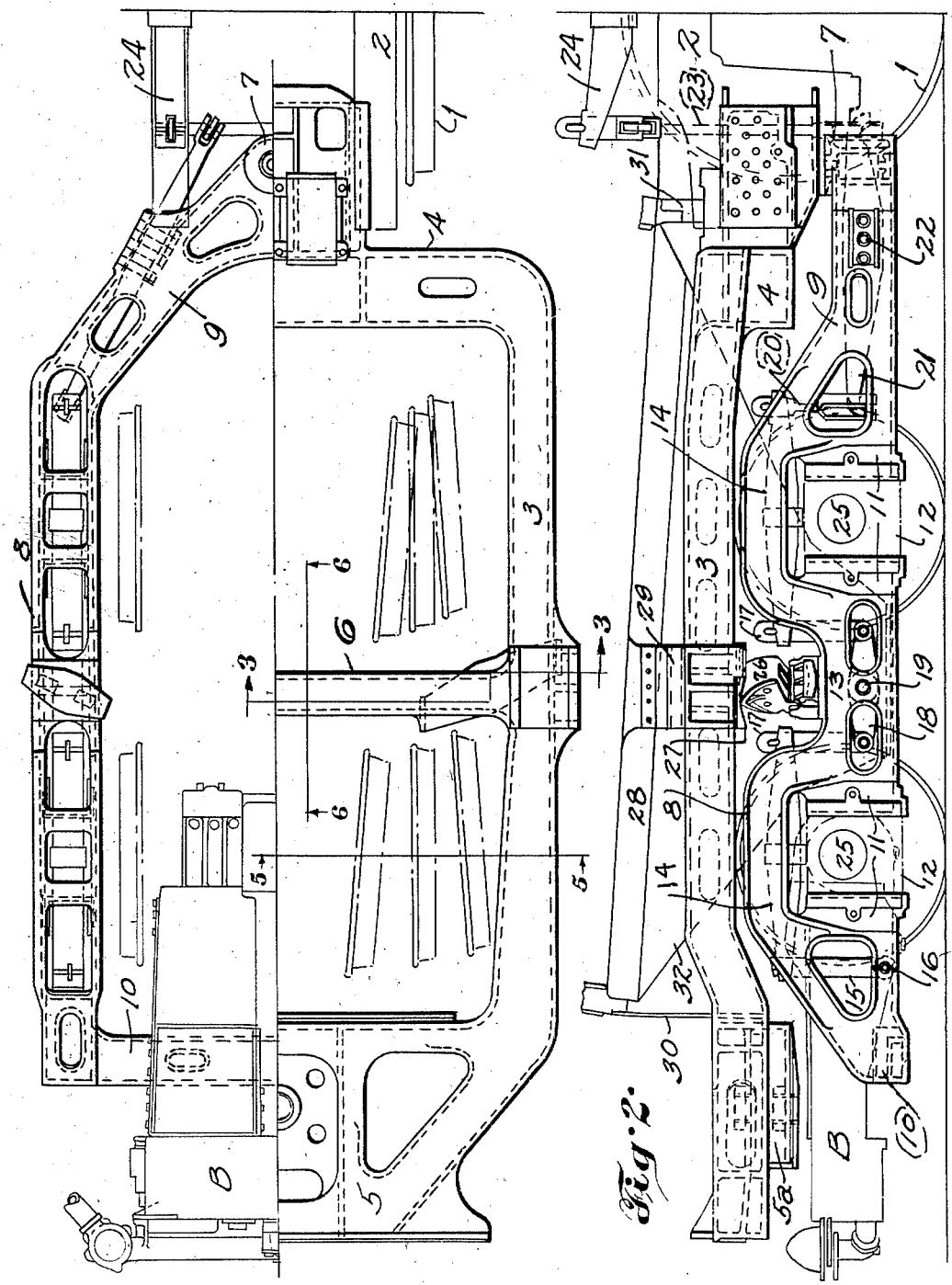

1,757,347

UNITED STATES PATENT OFFICE

JAMES C. TRAVILLA, JR., OF UNIVERSITY CITY, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

LOCOMOTIVE STRUCTURE

Application filed February 10, 1928. Serial No. 253,378.

My invention relates to railway rolling stock and consists in a novel truck structure and associated framing and superstructure, and is particularly adapted for use in locomotives. In the selected embodiment of my invention described in this application, I utilize a locomotive main frame with a rear extension or cradle, a four wheel trailer truck radially connected to the main frame and supporting the cradle, and a fire box carried by the cradle.

One of the objects of my invention is to make possible the use of lighter and shallower sections in the truck frame and cradle members by reducing the bending moments resulting from buffing forces; and to reduce the distance from the rail to the top of the cradle when the cradle is located above the wheelpiece of the truck frame.

Other objects are to provide an improved cradle structure; a suitable ash pan arrangement for such cradle structure; to efficiently mount a booster motor on my improved truck in such a manner as to best distribute all of the load carried by the truck, and to properly equalize all of the truck load with the main spring system of the locomotive.

These objects are attained by providing a support for the cradle intermediate the truck frame axles and supporting the fire box on the cradle at a point over the truck support, and by other detailed structure set forth below.

In the accompanying drawings which illustrate my invention—

Figure 1 is a top view of the rear portion of a locomotive framing, the lower half illustrating a cradle structure, and the upper half illustrating the truck frame structure. In this view different positions of the truck wheels relative to the cradle, are indicated by broken lines. It will be understood that these positions are assumed by the wheels on curved track.

Figure 2 is a side elevation of the structure shown in Figure 1.

Figure 3 is a transverse vertical section taken on line 3—3 of Figure 1.

Figure 4 is an end elevation of one-half of the cradle.

Figure 5 is a vertical transverse section taken on line 5—5 of Figure 1.

Figure 6 is a vertical longitudinal section taken on line 6—6 of Figure 1.

The rear driver of the locomotive is indicated at 1 and the rear portion of the main frame proper is indicated at 2. A rear extension or cradle may be formed integrally with or attached to the main frame 2 and is shown as comprising box-shaped side members 3 connected at the front by a box-shaped cross member 4, and at the rear by cross members forming a foot plate 5, with integral draw-bar pocket 5ª, and the side members 3 are also connected intermediate their ends by a cross tie 6 of box-shaped cross section.

The trailer truck is pivotally connected to the main frame at 7 and comprises wheel pieces 8 converging at their forward ends as indicated at 9 and connected at their rear ends by a box-shaped end rail 10. The intermediate portions of the wheel pieces 8 include integral pedestal jaws 11 between which the journal boxes 12 are mounted, and each wheel piece is depressed between the pedestals as indicated at 13.

The truck frame is supported at the journal boxes 12 by means of springs 14 carried on the journal boxes and supporting the truck frame through a link 15, anchored to the frame at 16, links 17 connected to opposite ends of a lever 18 which is pivoted to the truck frame at 19, and a link 20 connected to one end of a lever 21 fulcrumed on the truck frame at 22 and having its opposite end supported by a link 23 from the rear end of the rear driver spring 24. This equalizing system is not new in itself.

Intermediate the truck axles 25, the wheel pieces of the truck frame mount rockers 26 which engage cooperating bearing members 27 mounted on the lower face of the cradle 3. Preferably the wheel pieces of the truck frame are depressed at this portion as indicated at 13. The particular form of rocker and the element carried thereby serves as an anti-friction bearing for the cradle and also serves as a truck centering device. This particular rocker and the corresponding bearing have been used previously but not in connection with a truck structure of the type illustrated. By mounting the rocker intermediate the truck axles the distance between the rocker and the main frame connection of the truck is much shorter than it would be if the rocker bearing were located at the rear of the cradle and the transverse movement of the cradle at its rocker bearing is decreased. Because of the decreased transverse movement of the truck at the cradle supporting point, the height and weight of the rocker structure can be reduced and, due to the decreased distance between the rocker and the frame connection of the truck, the cross sectional area of the cradle sides 3 may be decreased. The size of members 3 may be decreased also because of the supporting of the mud ring 28, and superstructure carried thereby, on the member 29 immediately over the rockers 26 as this prevents upward deflection of the cradle members and practically eliminates eccentric bending movements due to pulling and buffing forces. The bearing of the mud ring may be of a sliding type such as is illustrated in Figure 3. It will be understood that this bearing is in addition to the usual expansion plate 30 provided at the rear of the mud ring and the ordinary sliding bearing 31 provided at the front end of the fire box.

Preferably a locomotive of the type and size requiring a four wheel trailer truck will be equipped with a booster motor and I illustrate such a motor at B, the same being carried on the end rail 10 of the truck frame and upon the rear truck axle 25.

The above described arrangement distributes the load to the truck frame more evenly than previous constructions where rockers are located at the rear end of the truck as the motor weight is carried on rail 10, thereby reducing the bending moment in the truck wheel piece. The cradle weight is carried at the intermediate depressed portion of the frame and the weight transmitted from the rear portion of the main frame proper is carried by the truck frame at the forward end of the latter through the universal joint 7. The support of the truck frame is also distributed through three spaced points, namely, the pivotal connection of hanger 15 and the fulcrum points 19 and 22 of levers 18 and 21, respectively.

On previous constructions where a large ash pan is required between the cradle side members and with a limited space between top of truck frame and mud ring, the cradle side members, because of their depth, have been located outside of the truck frame wheel pieces. With my arrangement a shallow cradle member is provided between top of truck frame and mud ring and in substantially the same vertical plane as the frame wheel piece and the mud ring without increasing rail height of fire box and the spacing of side members can be reduced. This arrangement also facilitates inspection of the parts mounted on the cradle and truck frame.

The cradle sides 3 are best braced by means of the cross tie 6 located at the point of support of the cradle and at the point where the cradle supports the fire box through bearings 29. To protect the cross tie from injurious action by the coals and ashes from the fire I provide the ash pan 32 (see Figure 6) with a transverse housing 33 adapted to receive the cross tie 6.

Obviously many of the details of the above described construction may be varied and some of the features referred to may be eliminated without departing from the spirit of my invention broadly, and I contemplate the exclusive use of all such modifications as come within the scope of my claims.

I claim:

1. In a locomotive, a truck with spaced axles, a truck frame mounted on said axles and provided with side bearings intermediate said axles, framing members supported on said bearings, and superstructure supported on said members over said bearings said bearings and members being in substantially the same vertical plane.

2. In a locomotive, a main frame, an extension thereon having side members, a draw bar pocket at the rear end of said extension, truck frame wheel pieces directly below and supporting said side members intermediate said main frame and pocket, and superstructure supported on said members over the latter's supports on said truck.

3. In a locomotive, a truck including wheel pieces each having spaced pedestals, side bearings mounted on said wheel pieces between said pedestals, a cradle including sides extending directly above said wheel pieces and resting on said bearings, and a transverse member connecting said sides adjacent said bearings.

4. In a locomotive, a truck including wheel pieces each having spaced pedestals, side bearings mounted on said wheel pieces between said pedestals, a cradle including sides extending over said wheel pieces and resting on said bearings, a transverse member connecting said sides adjacent said bearings, and fire box structure supported on said sides adjacent to said bearings.

5. In a locomotive, a main frame, a trailer truck frame pivoted thereto and including a wheel piece, a rearward extension on said main frame projecting over said wheel piece in substantially the same vertical plane, and side bearings on said wheel piece for supporting said extension and located intermediate the ends of said wheel piece.

6. In a locomotive, a main frame, a trailer truck frame pivoted thereto, and including a wheel piece mounting spaced axle journal boxes, an extension on said main frame projecting over said wheel piece in substantially the same vertical plane, and side bearings on said wheel piece, between said axles, for supporting said extension.

7. In a locomotive, a main frame, a trailer truck pivoted thereto and including wheel pieces, an extension on said main frame including side members located in substantially the same vertical planes as said wheel pieces, and bearings on said wheel pieces for said side members.

8. A one piece railway truck frame including wheel pieces each provided with a plurality of journal box pedestals and being depressed between said pedestals to mount a side bearing or gravity centering device.

9. A one piece railway truck frame including wheel pieces each provided with a plurality of journal box pedestals and being depressed between said pedestals to mount a side bearing, and a transverse member spaced from the depressed portions of said wheel piece and provided with a support for a booster motor.

10. In a railway truck, wheel pieces having spaced pedestals, and a framing support member carried on said wheel pieces between said pedestals, and below the level of the top of said wheel pieces.

11. In a railway truck, wheel pieces having spaced pedestals, and an anti-friction bearing, for supporting vehicle framing, mounted on each of said wheel pieces between said pedestals with its base below the top of the portions of the adjacent wheel piece at both sides of said bearing.

12. In a railway truck, wheel pieces having spaced pedestals, and gravity centering devices for the truck mounted on said wheel pieces between said pedestals and below the level of the top of the portions of said wheel pieces of both sides of said devices.

13. In a truck, a truck frame, spaced axles, journal boxes carried thereby, springs carried on said journal boxes, an equalizing lever supported at its ends by said springs and fulcrumed between its ends on said frame, and a side bearing on said frame above the fulcrum for said lever but below the top of said frame.

14. In a locomotive four wheel trailer truck, a frame, a spring equalizing system supporting said frame at the ends of the latter and intermediate its ends, and rocker bearings on said frame intermediate the truck axles but below the top of said frame.

15. In a locomotive plural axle truck including a frame, a booster engine carried on one end of said frame, and main frame supports on the other end of said frame and intermediate its axles.

16. In a locomotive cradle, a side member provided intermediate its ends with a mud ring support on its upper face and with a side bearing mounting on its lower face.

17. In a locomotive, a cradle, a fire box mud ring, an expansion plate support on said cradle for one end of said mud ring, a sliding bearing support for the other end of said mud ring, and a support on said cradle for said mud ring intermediate the ends of the later.

18. In a locomotive, a cradle, a fire box mud ring, a support for said mud ring located near the end of said cradle, and a sliding bearing on said cradle for supporting said mud ring intermediate its ends.

19. In a locomotive, a cradle having spaced sides, an ash pan located between said sides and having a hollow transverse member and ash receiving elements directly below said member, and a cross tie extending through said member and connecting said cradle sides.

20. A one piece cradle for locomotives comprising spaced side members of box-shaped cross section, and a box-shaped cross tie connecting said members intermediate the ends of the cradle.

21. In a railway truck frame structure, spaced journal box pedestals, on each side of the frame, a wheel piece connecting the pedestals on each side of the frame, and depressed between them to mount side bearings, and a transverse member spaced from the depressed portions of said wheel pieces and provided with a support for a booster motor.

22. In a locomotive, a truck including wheel pieces, each having spaced pedestals, side bearings mounted on said wheel pieces between said pedestals, a mud ring, and a cradle having side members extending between said mud ring and wheel pieces and resting on said side bearings, said wheel pieces, side bearings, mud rings and cradle side members being in substantially the same vertical plane.

23. In a locomotive, a cradle having spaced sides, an ash pan located between said sides and having a hollow transverse member with a sloping top wall, there being ash receiving space directly below said member and a cross tie extending through said member and connecting said cradle sides.

24. In a locomotive, a cradle, a fire box mud ring, a support for said mud ring located near the end of said cradle, and means for supporting said mud ring on said cradle intermediate the ends of said mud ring.

25. In a locomotive four wheel trailer truck, a frame, a spring equalizing system supporting said frame at the ends of the latter and intermediate its ends, and a gravity centering device for the truck mounted on said frame intermediate the truck axles and below the top of the frame.

26. In a locomotive, a main frame, a trailer truck pivoted thereto and including wheel pieces, an extension on said main frame including side members located in substantially the same vertical plane as said wheel pieces, and gravity centering devices on said wheel pieces actuated by engagement with said side members.

27. In a locomotive, a main frame including a portion extending rearwardly from the rear driving wheels of the locomotive, said portion having side members, a truck supporting said side members intermediate the front and rear ends thereof, and superstructure supported on said side members over the latter's supports on said truck.

28. In a locomotive, a main frame, a trailer truck frame pivoted thereto and including a wheel piece, a rearwardly extending member on said main frame projecting substantially vertically over said wheel piece, and a gravity centering device between said wheel piece and said extension, said device being located intermediate the ends of said wheel piece.

In testimony whereof I hereunto affix my signature this 25th day of January, 1928.

JAS. C. TRAVILLA, Jr.